May 8, 1923.                                                              1,454,132
R. S. M. MITCHELL
SHOCK ABSORBER
Original Filed Jan. 10, 1920
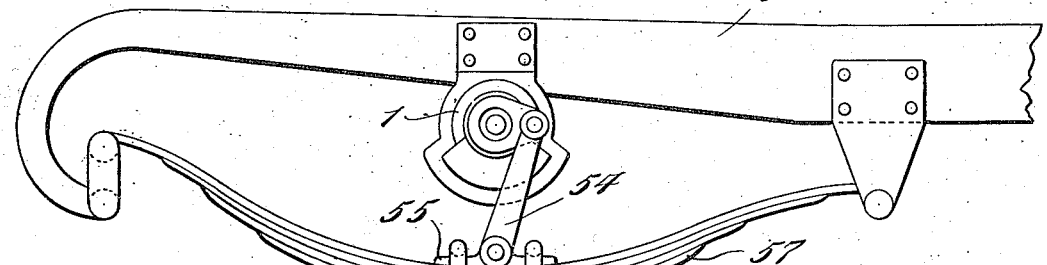
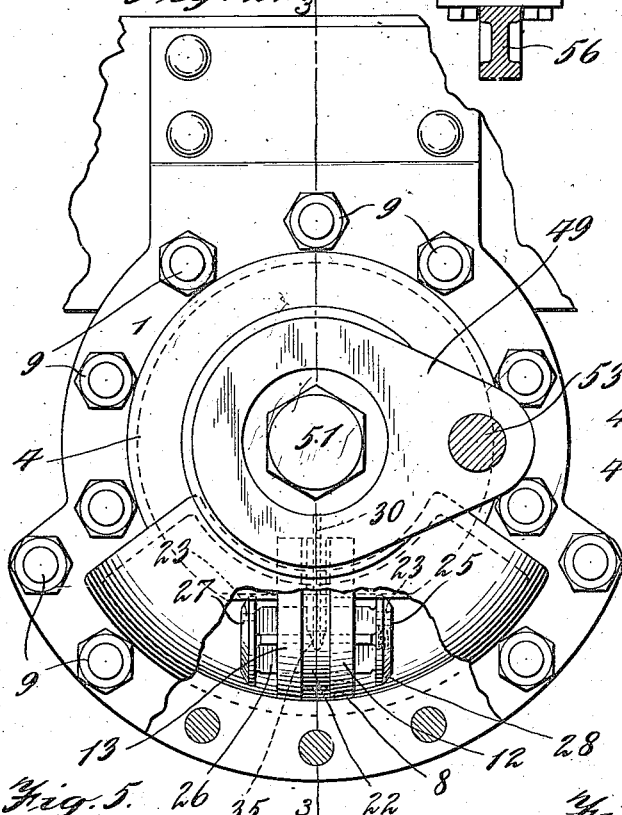
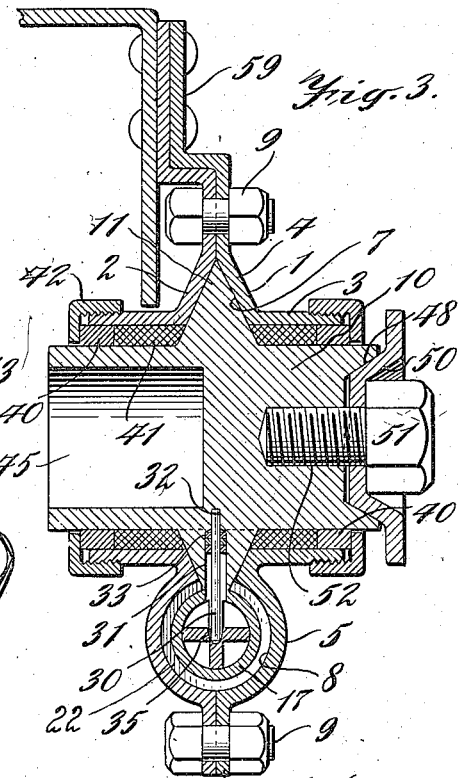
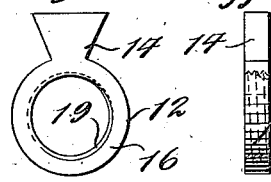
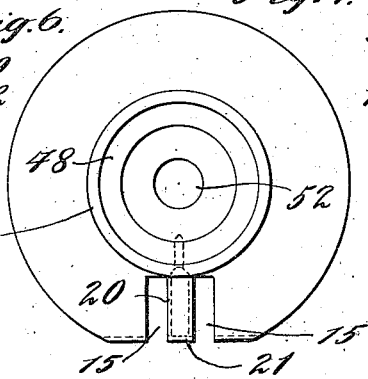
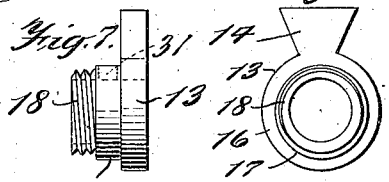
WITNESS:
Geo. C. Cheney
Lillian R. Fox
INVENTOR.
Richard S. M. Mitchell
BY Arthur L. Kuss
his ATTORNEY.

Patented May 8, 1923.

1,454,132

UNITED STATES PATENT OFFICE.

RICHARD S. M. MITCHELL, OF BRIDGEPORT, CONNECTICUT.

SHOCK ABSORBER.

Application filed January 10, 1920, Serial No. 350,534. Renewed September 27, 1922. Serial No. 591,005.

*To all whom it may concern:*

Be it known that I, RICHARD S. M. MITCHELL, a citizen of the United States, residing at Bridgeport, Fairfield County, Connecticut, have invented certain new and useful Improvements in Shock Absorbers, fully described and represented in the following specification and the accompanying drawings, forming a part of the same.

This invention relates to shock absorbers, that is to say, to devices for controlling the relative movement of two bodies. My device is of particular value in vehicles, especially motor road vehicles, in which it may be used to control the movement of the wheel axle in relation to the vehicle frame.

By my invention, I have provided a shock absorber of great simplicity and durability and of small manufacturing cost. The device may be very simply adjusted when adjustment is necessary and will retard the movement of the axle in either direction with relation to the vehicle frame in accordance with the speed of the initial movement of the axle, and with automatic accommodation to variations in speed during continued movement of the axle in relation to the frame.

In order that my invention may clearly be understood, I will first describe a particular embodiment of it which is illustrated in the accompanying drawings, in which:—

Fig. 1 is a side elevation of a shock absorber attached to a motor road vehicle;

Fig. 2 is an enlarged view in side elevation, partly broken away;

Fig. 3 is a section of the shock absorber on the line 3-3 in Fig. 2;

Fig. 4 is a side view of the oscillating member;

Fig. 5 is an end view of the piston section 12;

Fig. 6 is a side view of the piston section 12;

Fig. 7 is a side view of the piston section 13; and

Fig. 8 is an end view of the piston section 13.

In the form of the invention shown in the drawings, the body of the shock absorber consists of a two-part casing of which the parts 1 and 2 may be substantially identical except when they may be differently formed, as in this instance, for attaching the body of the device to the vehicle frame. Each part of the casing comprises a sleeve 3, a conical part 4, an enlargement 5 which is in the form of a sector of a toroid of semi-circular cross-section, and a circumferential flange 6. When the two parts of the casing are put together as best understood in Fig. 3, they provide a flange chamber 7 and an annular cylinder 8, that is to say, the cylinder 8 has the form of a sector of a ring of circular cross-section. In the inner wall of the cylinder 8 is an opening in the form of a longitudinal slot communicating with the flange chamber 7. Bolts and nuts 9 or other suitable fastenings cooperating with flanges 6 hold the parts of the casing together after other parts of the device have been assembled.

Within the casing is located an oscillating member comprising a hub 10 carrying a flange 11 which fits the chamber 7 and extends into the longitudinal slot in the cylinder wall. A piston is located in the cylinder 8 and secured to the flange 11. This piston comprises two sections 12 and 13 shown in detail in Figs. 5, 6, 7 and 8. Each of these parts has a base 14 coinciding in outline with the cross-sectional shape of flange 11, and the flange is provided with slots 15 (Fig. 4) to receive these bases. Each of the piston sections 12, 13, also has a ring-shaped member 16 connected to the base, and the ring 16 of the section 13 has a cylindrical extension 17 provided with a screw-threaded portion 18 (Figs. 7, 8) adapted to engage an internal thread 19 formed in the ring-shaped portion of the other piston section 12 (Figs. 5, 6). Two piston rings 22 are placed around the portion 17 of the piston section 13, and the piston sections are then screwed together and are secured to the flange 11 by placing their bases 14 in slots 15. The fit of the bases in the slots may be a drive or press fit to insure sufficiently firm retention of the piston in the disc. The ends of the piston rings 22 abut against the outer portion of the flange 11, as shown in Fig. 3.

The end of the portion 20 of the flange 11 between slots 15 is cut away at 21 (Fig. 4) to accommodate cylindrical part 17 of piston section 13 (Fig. 7). Within the opening through the piston sections is located a valve 25 which consists of a body 26 of cross-shaped section having at one end an integral head 27 and at the other end a detachable head 28 which is screwed on to the body after passing the body 26 through the piston (Figs. 2, 3). When the valve is in central position, as shown in Fig. 2, there is considerable clearance between the inner face of each head and the adjacent face of the piston. When the valve is pulled to its extreme position in either direction, the passage through the piston is closed by the contact between one of the valve heads 27, 28 and one of the piston sections 12, 13. A small hole 23 through each of the valve heads 25, 27 may be provided for the purpose hereinafter specified.

To locate the valve normally in this position and to provide for the desired variable action of the shock absorber, a spring is provided acting between the valve and the oscillatable hub 10 or flange 11. In the form shown in the drawings this spring consists of a rod 30 of spring metal of moderate diameter which passes through a hole 31 bored through portion 17 of the piston section 13 and the portion 20 of the flange (Fig. 4), and is seated with a press or drive fit in a counterbore 32 continuing inward from the inner end of the hole 31 into the hub 10 (Fig. 3). Hole 31 is sufficiently large to provide a substantial clearance around part of the spring rod. One or more small washers 33 may be passed over the end of the spring rod and pushed down to the bottom of hole 31 where they are retained by forming the peripheries of the washer of such dimensions that they have a drive or press fit in the hole, or by forming the holes in the washers of such dimensions that they have a drive or press fit on the spring rod 30. By suitably varying the number of washers the effective stiffness of the spring is varied, since it deflects only from its point of engagement with the outermost washer. The outward end of spring 30 is located in a suitable socket 35 formed in the body 26 of the valve.

As seen in Fig. 2, the sleeves 3 of the casings 1, 2, are designed so that they provide considerable space between them and hub 10. Bearing rings 40 are placed between the hub and each sleeve, near the outer ends of the latter. Packing 41 is located between the hub and each sleeve inwardly from the ring 40. A flanged nut 42 is screwed on to an external thread provided on the end of each sleeve. The flanges of these nuts retain the rings 40 in position and through the rings suitably compress the packing 41.

The cylinder 8 is filled with a grease or oil, usually an oil of medium viscosity, and this is retained by the packing means described, and lubricates the moving parts of the device as well as acting as the shock-absorbing medium in cooperation with the valve, piston and cylinder.

The hub 10 may be bored or otherwise hollowed out at one end, as at 45, for the sake of lightness. In the other end of the hub, a depression is formed having a conical wall 48. An operating arm 49 is secured to this end of the hub by providing the arm with a conical portion 50 to fit the conical depression 48. A screw 51 passing through the center of conical part 50 of the arm and engaging a threaded hole 52 in the hub locks the arm securely to the hub after its angular position has been properly determined. The outer end of arm 49 is provided with a hole 53 for the connection of a link 54, the other end of which is connected to a fitting 55 on the axle 56 or spring 57 of the vehicle. The casing is connected to the frame 58 of the vehicle in any convenient way. The parts 1, 2, of the casing may have extension members 59 suitably formed for riveting to the frame, or special attachment devices may be provided to fit the frame or to engage with suitable frame fittings, and these attachment devices may be secured to flanges 6 of the casing by some of the bolts 9.

The operation of the embodiment of my invention which has been described is as follows:—With the vehicle normally loaded, the piston will normally be at about the center of the cylinder and the valve will be centered in the piston, as shown in Fig. 2. When one of the vehicle wheels strikes an obstruction, the corresponding end of the axle rises in relation to the vehicle frame more or less quickly, depending on the height of the obstruction and the speed of the vehicle. By link 54 and arm 49 the piston is moved toward one end of the cylinder through the contained check liquid, which immediately flows past one of the valve heads 28 and through the spaces between the flanges of the cross shaped valve body, and so to the other end of the cylinder. If the movement of the piston is slow or small, corresponding to a small obstruction, or to normal spring movement of moderate speed, spring 30 holds the valve substantially centered in respect to the piston during its movement, and there is only a moderate or negligible resistance afforded by the oil to the piston movement. If, however, the movement of the piston is fairly rapid, corresponding to a considerable obstruction or extreme axle movement, the resistance of the oil to the valve heads 27, 28, displaces the valve backwardly in relation to the direction of piston travel against the resistance of spring 30 and closes the available opening for the passage of oil to a proportionate degree with a proportionate retardation of the piston movement and consequently of the axle movement, and, therefore, of the shock imparted to the vehicle frame. In case of a succession of upward movements of the axle, within the permitted limits of axle movement, the device will act at each stage of the successive movements to close the oil opening in proportion to the force exerted, and so to protect the vehicle very effectively from considerable shocks throughout the entire range of spring movement. Similarly, the device will act as the spring returns to normal position, or when the spring drives the axle downward from normal position as the wheels drop into a hole in the road, for example, to prevent to a great extent throwing the vehicle upward and throwing the wheels off the road in the one instance, and to prevent improperly rapid or extreme extension of the springs in the other instance.

The hole 23 through the valve heads provides for the passage of oil from one part of the cylinder to the other, even when the valve is entirely closed, as when a particularly heavy shock or rapid axle movement causes one of the heads 28 to be driven all the way back against the adjacent piston section. The hole is not always necessary, and when used, its size is determined in accordance with the stiffness of the vehicle spring under sudden loads.

It will be understood that my shock absorber need not be attached to the vehicle n the way shown in Fig. 1. Numerous other methods of attachment are well known to those familiar with the art. The device may be so attached that the hub 10 is held stationary while the casing 1 rotates about it when the axle moves relative to the vehicle frame. Or the device may be so attached that both the hub and the casing have a rotative movement. The use of the device is not limited to its application to vehicles, as it may be applied to any two members for the purpose of checking sudden movements of one or both of them.

It will be understood that my invention is by no means limited to the specific shock absorber which I have illustrated and described. Many changes may be made in the shape and arrangement of the parts without departing from my invention.

What is claimed is:

1. A shock absorber for controlling the relative movement of two bodies, comprising two concentric members, connecting means between each of said members and each of said bodies so arranged that relative motion of the bodies produces a relative rotative movement of the concentric members, a cylinder of the form of a sector of an annulus borne by one of said concentric members, a piston in said cylinder attached to the other of said concentric members, and a fluid in said cylinder.

2. A shock absorber for vehicles, comprising two concentric members, connecting means between one of said members and the vehicle frame, and connecting means between the other of said concentric members and the vehicle axle, said connecting means being so arranged that a movement of the axle relative to the vehicle frame produces relative rotative movement of the concentric members, a cylinder of the form of a sector of an annulus borne by one of said concentric members, a piston in said cylinder attached to the other of said concentric members, a fluid in said cylinder, and a passage for said fluid from the portion of the cylinder at one side of the piston to the portion of the cylinder at the other side of the piston.

3. In a shock absorber, two concentric relatively rotatable members, a cylinder of the form of a sector of an annulus borne by one of said members, a piston in said cylinder attached to the other of said members, a fluid in said cylinder surrounding said piston, said parts being formed to provide a passage for said fluid from the part of the cylinder at one side of the piston to the part of the cylinder at the other side of the piston, a valve in said passage so arranged that flow of the fluid through said passage tends to close it, and a spring tending to hold said valve in open position.

4. In a shock absorber, two concentric relatively rotatable members, a cylinder in the form of a sector of an annulus borne by one of said members, a piston in said cylinder attached to the other of said members, a fluid in said cylinder surrounding said piston, said parts being formed to provide a passage for the fluid through said piston, a valve in said passage so arranged that movement of the fluid through the passage tends to close it, and a spring tending to hold said valve in open position.

5. In a shock absorber, two concentric relatively rotatable members, a cylinder in the form of a sector of an annulus borne by one of said members, a piston in said cylinder attached to the other of said members, a fluid in said cylinder surrounding said piston, said parts being formed to provide a passage for the fluid from the portion of the cylinder at one side of said piston to the portion of the cylinder at the other side of the piston, a valve in said passage arranged to be closed by a rapid movement of the fluid through the passage, a spring tending to hold said valve in open position, and a small passage through the piston, always open, to permit of slight piston movement, when a sudden shock closes the valve.

6. In a shock absorber, two concentric relatively rotatable members, a cylinder in the form of a sector of an annulus borne by one of said members, a piston in said cylinder attached to the other of said members, a fluid in said cylinder surrounding said piston, said parts being formed to provide a passage for said fluid through said piston, a double valve in said passage arranged to be closed by a rapid movement of the fluid through said passage in either direction, and a spring coacting with said valve and tending to hold it in open position.

7. In a shock absorber, a rotatable hub, a flange on said hub, a piston carried by said flange, a passage through said piston, a double valve in said passage, a spring rod mounted in said hub and coacting with said valve, and tending to hold the valve normally in open position.

8. In a shock absorber, a rotatable hub, a flange on said hub, a piston carried by said flange and having a passage therethrough, a double valve in said passage, a spring rod coacting with said valve, and seated in a hole in said flange, an enlarged opening in said flange surrounding the outer portion of said spring rod, and washers adapted to be placed in said opening around said spring rod to vary the tension of the spring rod upon the valve.

9. In a shock absorber, a cylindrical casing, a cylinder of the form of a sector of an annulus borne by said casing and having a slot in its inner wall communicating with the interior of said casing, a hub in said casing rotatable relative thereto, a circumferential flange on said hub closing said slot in the cylinder wall, and a piston in said cylinder attached to said flange and lying without the periphery of said flange.

10. In a shock absorber, the combination of a cylinder having a longitudinal slot in its wall, a flange-shaped member adapted to close said slot and move longitudinally therein a piston in the cylinder rigidly attached to said member and projecting beyond the edge of said member, and a liquid in the cylinder surrounding the piston.

11. In a shock absorber, the combination of a cylinder having a longitudinal slot in its wall, a member adapted to close said slot and move longitudinally therein, a piston having a passage therethrough in the cylinder attached to said member, a liquid in the cylinder surrounding the piston, a valve in the passage in said piston so arranged that movement of the fluid through the passage tends to close it, and a spring adapted to hold said valve normally in open position.

12. In a shock absorber, the combination of a cylinder having a longitudinal slot in its wall, a member adapted to close said slot and to move longitudinally therein, a piston having a passage therethrough in the cylinder attached to said member, a liquid in the cylinder surrounding the piston, a valve in the passage in said piston so arranged that movement of the fluid through the passage tends to close it, and a spring rod seated in said longitudinally movable member and coacting with said said valve to hold it normally in open position.

13. In a shock absorber, an oscillatory hub having a circumferential flange and a cylindrical portion at each side of the flange, a piston borne by said flange, and a casing enclosing said hub and providing a piston chamber in the form of a sector of an annulus having a slot on its inner side for the passage of said flange.

14. In a shock absorber, an oscillatory hub having a circumferential flange and a cylindrical portion at each side of the flange, a piston borne by said flange, a casing enclosing said hub, providing a piston chamber in the form of a sector of an annulus having a slot on its inner side for the passage of said flange, a fluid in said casing filling said piston chamber, and means between the cylindrical portions of the hub and the casing for preventing the escape of said fluid.

15. In a shock absorber, two relatively rotatable members, a closed piston chamber in the form of a sector of an annulus borne by one of said members, a piston in said chamber rigidly attached to the other of said members, and piston rings upon said piston.

16. In a shock absorber, an oscillatory hub having a flange, a piston borne by said flange, a casing enclosing said hub and providing a piston chamber in the form of a sector of an annulus with a slot in its side for passage of said flange, and piston rings extending part way around said piston and having ends abutting against opposite sides of said flange.

17. In a shock absorber, an oscillatory hub having a circumferential flange and a cylindrical portion at each side of the flange, a piston borne by said flange, a casing enclosing said hub and consisting of two parts, each having a cylindrical bearing surface surrounding one of the cylindrical portions of said hub, a portion adapted to enclose said flange, a portion in the form of a sector of a toroid of semi-circular cross-section, and a circumferential flange, and means for attaching together the circumferential flanges of said two parts.

18. In a shock absorber, an oscillatory hub having a circumferential flange and a cylindrical portion at each side of said flange, a piston borne by said flange, a spring-opened valve in said piston, a casing enclosing said hub providing a piston chamber in the form of a sector of an annulus and having a slot at its inner side for the passage of said flange, a fluid in said casing filling said piston chamber, and means for preventing the escape of said fluid between said hub and said casing.

19. A shock absorber for vehicles, comprising a cylinder and a piston therein, connecting means between one of said members and the vehicle frame, connecting means between the other of said members and the vehicle axle, such connecting means being so arranged that relative movement of the vehicle frame and axle upon deflection of the vehicle springs produces movement of the piston in the cylinder, and automatic means independent of the position of said piston in said cylinder for checking the movement of said piston relative to said cylinder when the rate of the relative movement of the vehicle frame and axle exceeds that normally permitted by the vehicle spring, while allowing the piston substantially free movement relative to the cylinder when the relative movement between the axle and the vehicle frame is at a lesser rate, so that the normal movement of the vehicle spring is substantially unaffected.

20. A shock absorber for vehicles, comprising two concentric members, connecting means between one of said members and the vehicle frame, connecting means between the other of said concentric members and the vehicle axle, said connecting means being so arranged that a movement of the axle relative to the vehicle frame produces relative rotative movement of the concentric members, a cylinder of the form of a sector of an annulus borne by one of said concentric members, a piston in said cylinder attached to the other of said concentric members, a fluid in said cylinder surrounding said piston, said parts being formed and arranged so as to provide a passage for said fluid from the portion of the cylinder at one side of the piston to the portion of the cylinder at the other side of the piston, and automatic means independent of the position of said piston in said cylinder for closing said passage when the relative motion of the axle and vehicle frame exceed that normally permitted by the vehicle springs, while permitting a free flow of fluid through said passage when the relative movement between the axle and vehicle frame is within the normal range of movement permitted by the vehicle springs.

In testimony whereof I have hereunto set my hand in the presence of two subscribing witnesses.

RICHARD S. M. MITCHELL.

Witnesses:
ETHEL JOHNES,
ROBERT W. BYERLY.